E. H. SHOLAR & W. W. PACE.
DISK PLOW.
APPLICATION FILED JULY 31, 1908.
No. 900,219.
Patented Oct. 6, 1908.
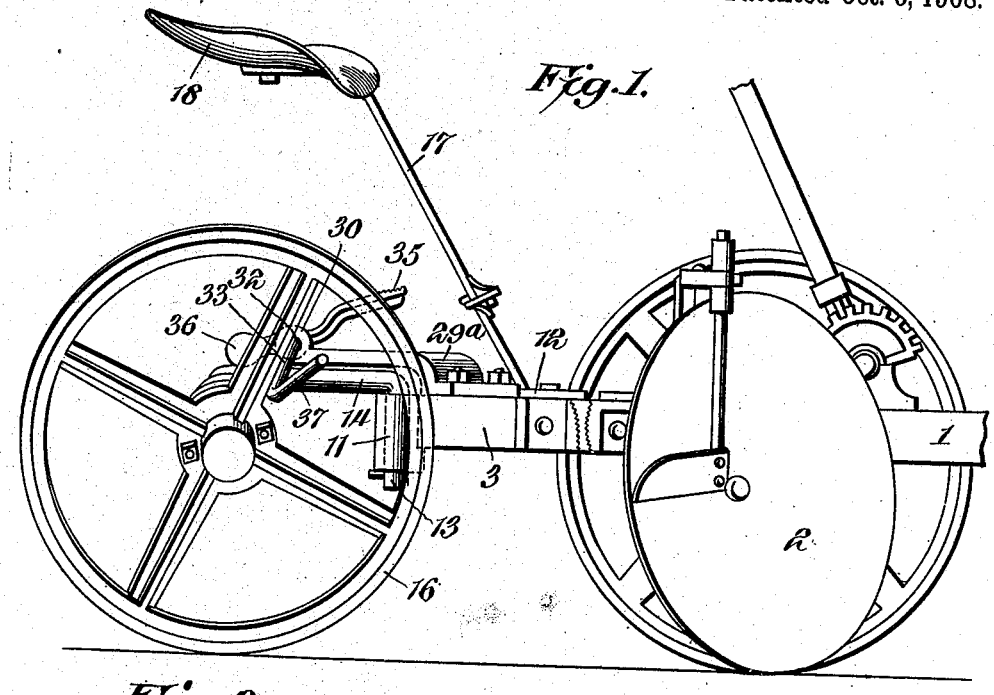
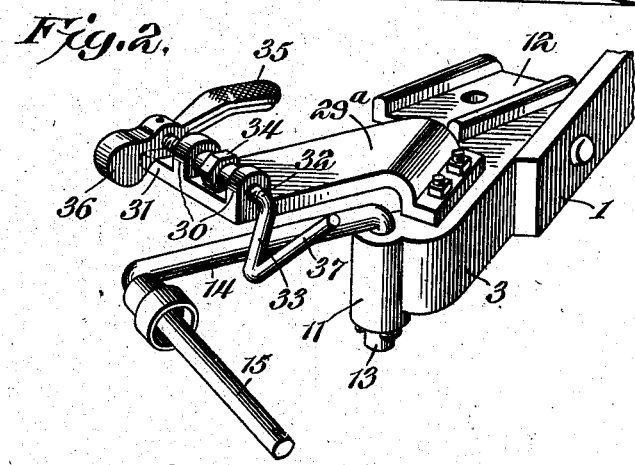
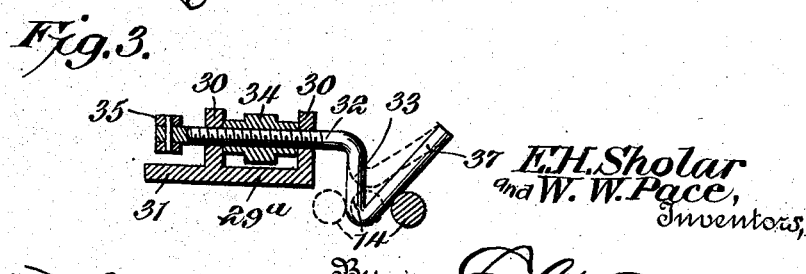
E. H. Sholar
and W. W. Pace,
Inventors
Witnesses
Howard D. Orr
By
E. G. Siggers
Attorney

UNITED STATES PATENT OFFICE.

EDWARD H. SHOLAR AND WALTER W. PACE, OF EAST CHATTANOOGA, TENNESSEE, ASSIGNORS TO VOLUNTEER DISC PLOW CO., A CORPORATION OF TENNESSEE.

DISK PLOW.

No. 900,219.　　　　Specification of Letters Patent.　　　　Patented Oct. 6, 1908.

Application filed July 31, 1906.　Serial No. 328,604.

*To all whom it may concern:*

Be it known that we, EDWARD H. SHOLAR and WALTER W. PACE, both citizens of the United States, residing at East Chattanooga, in the county of Hamilton and State of Tennessee, have invented a new and useful Disk Plow, of which the following is a specification.

This invention relates to disk plows.

The general object of the invention is to produce a disk plow of extremely simple and inexpensive construction in which all unnecessary parts and adjustments are eliminated, and in which the necessary adjustments are effected by mechanism of the simplest possible form consistent with maximum efficiency. Subordinate to this general object are certain specific objects, the most prominent of which is: to provide an improved stop for the trailing axle of the rear furrow wheel, said stop being adjustable to vary the limit of movement of the axle, arranged for release by the foot of the operator, and so constructed that when the plow is drawn straight ahead after a turn to the right, the stop will permit the trailing axle to assume its proper position and will then automatically assume its operative position to act as a stop for the axle.

To the accomplishment of this and other objects, which will more fully appear hereinafter, the invention resides in the construction and arrangement of parts described in the following specification, illustrated in the accompanying drawings, and succinctly defined in the appended claims.

In the drawings: Figure 1 is a side elevation of a portion of a plow, showing the improvements applied thereto. Fig. 2 is a detail perspective view of the trailing axle, the axle stop and associated parts. Fig. 3 is a sectional view of the axle and axle stop, certain positions of the parts being shown in dotted lines.

Each part is indicated by the same reference character in all the views.

The frame of the plow includes a beam 1 on which is suitably mounted a disk 2. A rear bracket 3 is bolted to and extends beyond the rear end of the beam 1 and is provided at its opposite ends with a vertically disposed bearing sleeve 11 and a horizontal seat spring socket 12. The sleeve 11 constitutes a bearing for the vertically disposed journal 13 of the trailing crank axle 14, the spindle 15 of which is supported by the rear furrow wheel 16. The spindle 15 is preferably disposed at an angle to the horizontal in order to incline or cant the rear furrow wheel in a manner to effectually resist the side draft of the plow. The lower end or foot of the seat spring 17 is bolted in the socket 12, as shown in Fig. 1, and at the upper end of the spring, the driver's seat 18 is mounted in the usual manner.

The present invention relates to the means for controlling the position of the trailing axle of the rear furrow wheel. Bolted to and extending rearwardly from the rear bracket 3 is a plate 29ª at the rear end of which are located a pair of vertically disposed bearing ears 30 and a horizontally disposed stop lug 31. Mounted to rotate in the ears 30 and disposed transverse to the line of draft is a stop shaft 32 provided at the right hand end with an axle stop 33 normally disposed in a nearly vertical position at the outer side of the trailing axle 14 and designed to arrest the outward movement of the latter relative to the plow frame.

For the purpose of adjusting the axle stop 33 transversely of the plow, a stop adjusting device or nut 34 is located between the ears 30 and is mounted on a threaded portion of the stop shaft 32. It will thus be seen that by rotating the nut 34 in one direction or the other, the stop shaft 32 may be moved endwise for the purpose of adjusting the stop 33 in accordance with the desired normal position of the trailing axle. While it is necessary to normally retain the trailing axle substantially in the line of draft, while plowing, it is desirable that the stop be capable of withdrawal from coöperative relation with the axle, in order to permit the latter to assume an angular position with respect to the plow frame when it is desired to make a turn to the right. For this reason, the stop 33 is mounted to swing into and out of its operative position, which it obviously may do by reason of the rotary mounting of the shaft 32.

To facilitate the swinging of the stop 33 to a position above the axle 14, the left hand end of the shaft 32 is provided with a foot piece or pedal 35 designed to be depressed by the foot of the driver, to swing the stop 33 to an inoperative position, and having a counterweight 36 which allows the stop 33 to swing back to its normal position when the pedal is released. The counterweight 36 is arranged to coöperate with the stop lug 31 to cause the axle stop to be arrested in the position shown in Fig. 3 when swung back. When the stop 33 is elevated in the manner stated, the axle 14 may assume an outward angular position beyond the stop, as for instance as indicated in full lines in Fig. 3, and in order to avoid the necessity for again operating the stop 33 to permit the axle to pass behind the same when the plow is drawn forward after a turn to the right, we have provided means whereby, when the axle swings to the left relative to the plow frame, from a position beyond or to the right of the stop, it will automatically elevate the stop and allow the same to drop back after the axle has reassumed its normal position. To attain this end, an inclined bar or cam 37 is extended from the lower end of the stop 33, said cam being inclined both outwardly and forwardly, as will be seen by reference to Figs. 1 and 4.

When the parts are in the positions indicated in Fig. 4, a straight-away pull on the plow will tend to cause the axle 14 to assume its normal position in the line of draft, and as said axle swings to the left relative to the frame, it will ride under the cam 37 and thus cause the stop 33 to be swung up to permit the axle to pass thereunder, after which the stop will swing back to its normal position and the axle will be prevented from again swinging to the right until the stop is swung up by the depression of the pedal 35.

It is thought that from the foregoing, the construction, operation and many advantages of our plow will be clearly comprehended; but while the illustrated embodiment of the invention is thought at this time to be preferable, we desire to be distinctly understood as reserving the right to effect such changes, modifications and variations of the illustrated structure as may be fairly embraced within the scope of the protection prayed.

What we claim, is—

1. A plow including a movable axle, a shaft having a bearing between its ends and adjustable longitudinally in said bearing, means for normally holding the shaft against longitudinal movement but permitting it to be adjusted, an axle stop carried by one end of the shaft on one side of the bearing, and operating means for the shaft engaged with the other end thereof on the other side of the bearing.

2. A plow including a bracket, a movable axle associated therewith, upstanding ears carried by the axle, a shaft journaled and longitudinally movable in the ears, means coöperating with the ears to hold it in different longitudinal positions, an axle stop carried by one end of the shaft and disposed at one side of the bracket, and a treadle secured to the other end of the shaft and located at the other side of the bracket.

3. A plow including a movable axle, a movable stop therefor, and a support for the stop longitudinally adjustable to different positions to vary the location of the stop.

4. A disk plow including a trailing axle, a rotary stop shaft, an axle stop carried at one end of the shaft, and an adjusting nut for said shaft.

5. A plow including a movable axle, and a pivotally mounted stop therefor, said stop being adjustable to different positions longitudinally of its pivot axis.

6. A plow including a movable axle, a longitudinally adjustable shaft, a stop coöperating with the axle and adjustable with the shaft, and means for rotating the axle to move the stop out of coöperation with the axle.

7. A disk plow including a trailing axle, and a stop shaft provided with an axle stop, a pedal and an adjusting nut.

8. A disk plow including a trailing axle, a stop shaft, a pair of bearing ears supporting said shaft, an adjusting nut engaging the shaft between the bearing ears to adjust said shaft longitudinally, an axle stop extending from one end of the shaft, and a pedal at the opposite end of said shaft.

9. In a plow, a movable axle, a longitudinally adjustable shaft, means engaging the shaft for adjusting it longitudinally and holding it in different positions, and a stop carried by the shaft and coöperating with the axle.

10. In a plow, a swinging axle, a bracket having spaced upstanding ears, a shaft journaled in the bracket, a nut located between the ears and engaged with the shaft, and an axle stop carried by the shaft.

11. In a plow, a swinging axle and a stop for the axle formed from a single rod and comprising a rotary shaft having an integral depending swinging axle stop at one end that coöperates with the axle, and an integral forwardly, upwardly and outwardly inclined cam bar projecting from the lower end of the stop and engaged by the axle to swing the stop to a position to allow the axle to pass it, when said axle moves in one direction.

12. In a plow, a swinging axle, a swinging stop for limiting the movement of the axle in one direction, and a pivot for the stop, said stop being moved to and from a position in the path of movement of the axle and said pivot being adjustable longitudinally of its axis and of said path of movement to stop the axle at different positions in said path.

In testimony, that we claim the foregoing as our own, we have hereto affixed our signatures in the presence of two witnesses.

EDWARD H. SHOLAR.
WALTER W. PACE.

Witnesses:
E. H. SPENCER,
ROY SMITH.